Patented Dec. 18, 1951

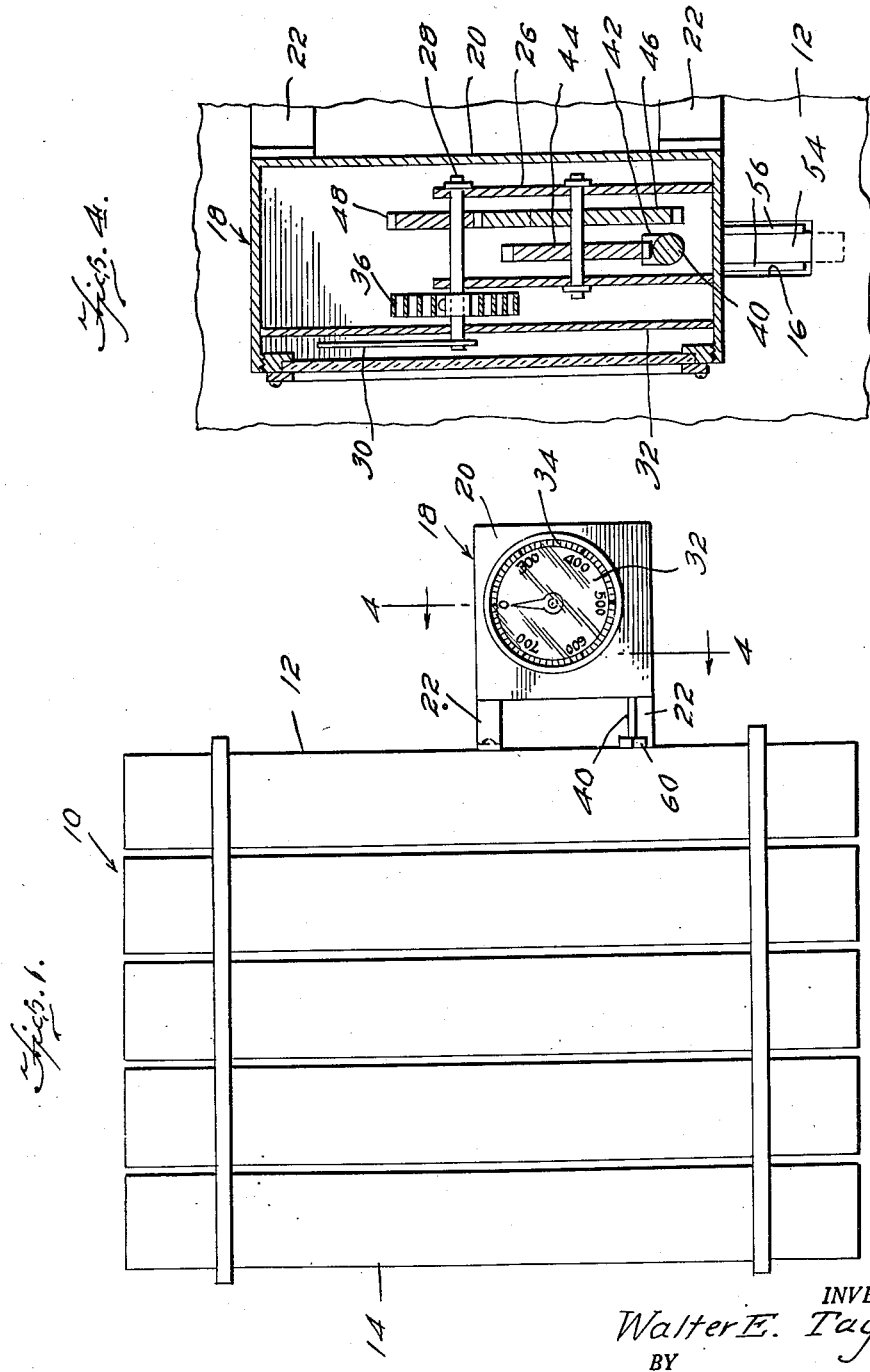

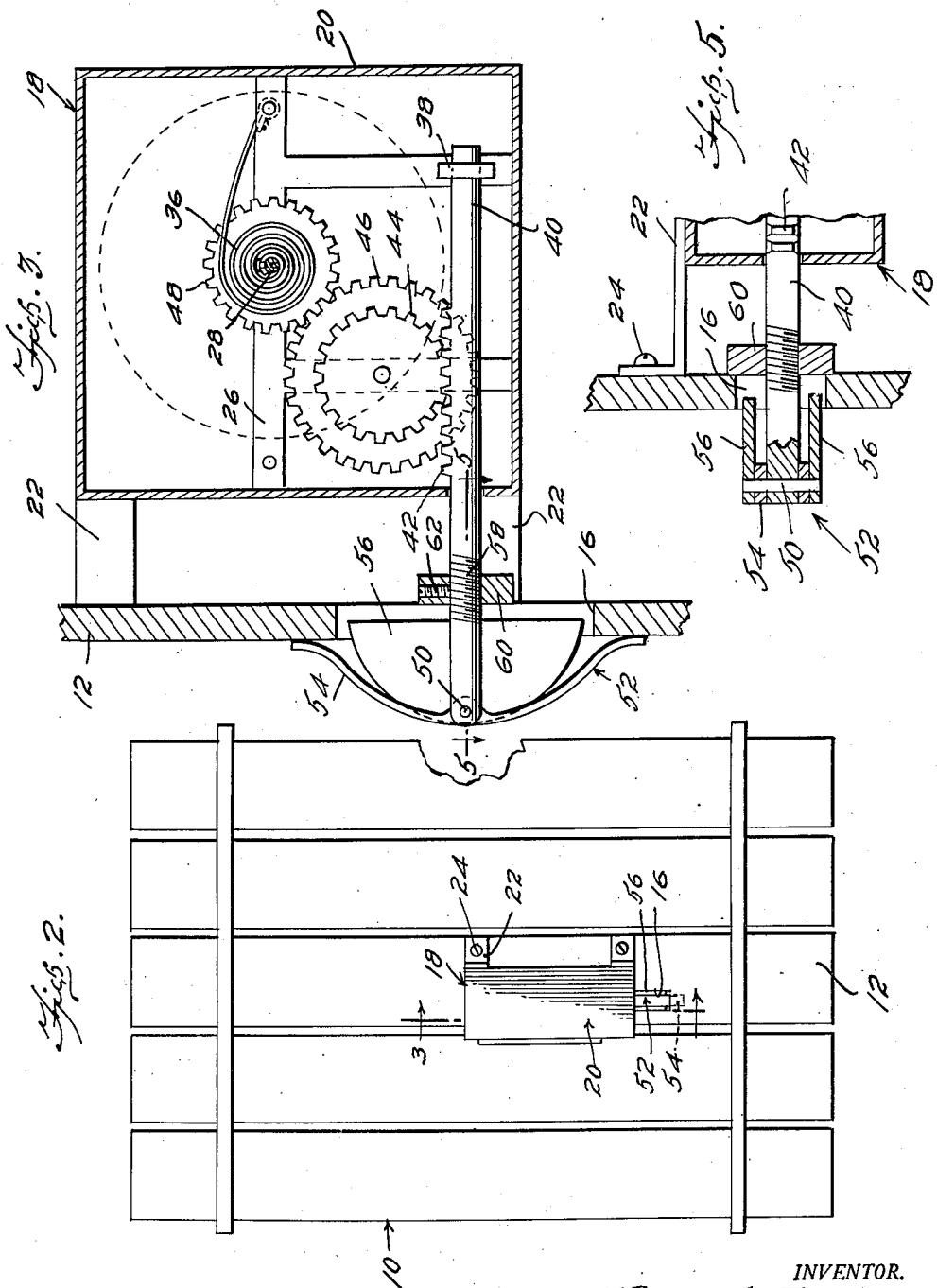

2,579,444

UNITED STATES PATENT OFFICE 2,579,444

BALE WEIGHT GAUGE

Walter E. Taylor, Pascola, Mo.

Application May 26, 1950, Serial No. 164,434

4 Claims. (Cl. 73—141)

This invention relates to a bale weight gage and more particularly to an attachment for a cotton baling press.

In the ginning and baling of cotton the weight of a bale is determined by the skill and experience of the press man, and it frequently happens that a bale will weigh less than the standard 400 pounds with the result that a penalty will be exacted against an underweight bale. If the bale weighs less than 300 pounds it will be rejected and must be placed back in the press for the addition of the necessary material to make up the required weight. Thus considerable loss may be encountered should the press man fail to produce bales of the standard 400 pound weight, not only in penalties exacted, but also in the time required to produce a rejected bale.

The primary object of this invention is to enable a pressman to determine in advance whether there is sufficient material present in the press to produce a bale of the required weight.

Another object is to assure the production of bales of substantially uniform weight and which will meet the minimum requirements without removing the bale from the press and weighing it.

The above and other objects may be attained by employing this invention which embodies among its features a resilient deformable head carried by a side wall of a baling press in a position to contact the substance being baled, indicating means mounted adjacent said side wall and means coupled to the indicating means and to the resilient deformable head for movement thereby, whereby the indicating means will be actuated as the substances compressed in the baling press so as to give an indication of the weight of the bale prior to its removal from the baling press.

In the drawings:

Figure 1 is a side view of a baling press showing this device attached thereto,

Figure 2 is an end view of the baling press showing the weight indicator in place thereon, Figure 3 is an enlarged vertical sectional view taken substantially along the line 3—3 of Figure 3, Figure 4 is a vertical sectional view taken substantially along the line 4—4 of Figure 1, and Figure 5 is a horizontal sectional view taken substantially along the line 5—5 of Figure 3.

Referring to the drawings in detail a baling press designated generally 10 is equipped with conventional side walls 12 between the upper ends of which a conventional plunger (not shown) works against the substance to be baled in a conventional manner. Formed in one of the side walls 12 is an elongated vertical slot 16 for the reception of the yieldable actuating head of this improved bale weight gage.

The bale weight gage designated generally 18 comprises a housing 20 having an arm 22 which is attached to the wall 12 adjacent the opening 16 as by suitable attaching screws 24.

Mounted within the housing 20 is a frame 26 in which a shaft 28 is mounted to rotate. This shaft extends through the housing 20 and carries adjacent its outer end a pointer 30 which moves over the face of a dial 32 carried by the housing and which is provided adjacent its periphery with indicia 34. These indicia 34 represent the weight of a bale in hundreds of pounds so that the pressman will have a visual indication of the weight of the bale being pressed. Fixed at one end to the shaft 28 is one end of a volute spring 36 and the opposite end of said spring being fixed to the frame 26 so as to yieldingly hold the hand 30 at the zero position on the dial 32. Mounted on the frame 26 for sliding movement in suitable brackets 38 is a rod 40 carrying on one side rack teeth 42 which mesh with a pinion 44. This pinion is connected through a conventional gear train 46 to a pinion 48 on the shaft 28, so that as the rod 40 is reciprocated in its supports 38 the shaft 28 will be rotated.

As illustrated in the drawings the rod 40 projects through the opening 16 in the side wall 12 and connected as by a pin 50 with the end of the rod 40 remote from the housing 20 is a yielding or deformable head designated generally 52. In its preferred form the head 52 comprises a bowed spring 54, opposite ends of which bear against the face of the side wall 12 remote from the indicator 18 so as to contact the material which is being baled. Guard plates 56 are supported on the pin 50 on opposite sides of the spring 54 and extend into the opening 16 on opposite sides of the spring 54 so that as pressure is exerted on the bowed face of the spring, the guard plates 56 will move in the the opening 16. Formed on the rod 40 adjacent the head 52 is an externally screw threaded portion 58 on which a nut 60 is threaded for engagement with the side of the side wall 12 remote from that contacted by the spring 54. This nut may take the form of a collar having threaded engagement with the threads 58, and extending radially through the nut or collar 60 is a set screw 62 by means of which the collar may be locked in adjusted position on the rod 40 so as to place the spring 54 under various degrees of tension, and after the adjustment has been made the collar will be locked by the set screw against rotation relative to the rod 40.

In use it will be understood that with the device mounted on the side wall 12 as disclosed, the material to be baled will of course bear against the side wall, thus placing the deformable or yielding head 52 under pressure. As the pressure on the yielding or deformable head 52 is increased, it is evident that it will deform or yield so as to cause the rod 40 to be moved in a direction or enter the housing 20 and rotate the pinions to cause the hand 30 to move over the face of the dial 32. The indicia on the dial are calibrated to give a direct reading in hundreds of pounds of the weight of the bale so that the pressman by reading the indicator can determine whether or not the bale will meet the minimum weight requirements. Obviously should it be under weight additional material may be introduced into the bale press before the baling operation is completed and consequently by the use of this device the pressman will know in advance to the completion of the baling operation the exact weight of the bale being produced. In this way much loss of time and expense may be avoided.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a bale weight gage a yieldable head mounted on a side wall of a baling press for contact with the substance being baled, indicating means mounted adjacent said side wall, a rod coupled to the indicating means and to the yieldable head for movement thereby, whereby said indicating means will be actuated as the substance is compressed by the baling press and the yieldable head yields under the pressure of the substance thereagainst, and means carried by the rod and engaging the side wall for regulating the pressure required to actuate the indicating means.

2. In a bale weight gage a resilient deformable head mounted on a side wall of a baling press for contact with the substance being baled, indicating means carried by said side wall, a rod coupled to the indicating means and to the resilient deformable head for movement thereby whereby said indicating means will be actuated as the substance is compressed by the baling press and the resilient deformable head is deformed by the pressure of the substance thereagainst, and a collar threaded on the rod and engaging the side wall for regulating the pressure required to actuate the indicating means.

3. The invention according to claim 2, wherein said side wall of the press has a slot through which said rod passes, the said resilient deformable head including a bowed spring connected intermediate its ends to the rod and having its ends in contact with the said side wall at the ends of the slot.

4. The invention according to claim 3, with guard plates disposed on opposite sides of said spring and secured to the rod and extending into said wall slot.

WALTER E. TAYLOR.

REFERENCES CITED

The following references are of record in the file of this patent:

UNITED STATES PATENTS

| Number | Name | Date |
| --- | --- | --- |
| 1,004,911 | Rouse | Oct. 3, 1911 |
| 1,340,964 | Ligon | May 25, 1920 |
| 1,981,354 | Goerg | Nov. 20, 1934 |
| 2,457,902 | Jones | Jan. 4, 1949 |

FOREIGN PATENTS

| Number | Country | Date |
| --- | --- | --- |
| 638,307 | France | Feb. 20, 1928 |
| 686,175 | France | Apr. 8, 1930 |
| 825,007 | France | Nov. 27, 1937 |